(12) United States Patent
Jurczyszak et al.

(10) Patent No.: US 10,795,386 B2
(45) Date of Patent: Oct. 6, 2020

(54) HOT WATER FAUCET

(71) Applicant: Rheem Manufacturing Company, Atlanta, GA (US)

(72) Inventors: Eric R. Jurczyszak, Berlin, CT (US); Curtis J. Keohane, West Hartford, CT (US); Sergiu G. Mihu, Newtown, CT (US); Christopher M. Hayden, Shelton, CT (US)

(73) Assignee: Rheem Manufacturing Company, Atlanta, GA (US)

( * ) Notice: Subject to any disclaimer, the term of this patent is extended or adjusted under 35 U.S.C. 154(b) by 12 days.

(21) Appl. No.: 16/138,538

(22) Filed: Sep. 21, 2018

(65) Prior Publication Data

US 2019/0094893 A1    Mar. 28, 2019

Related U.S. Application Data (60) Provisional application No. 62/562,120, filed on Sep. 22, 2017.

(51) Int. Cl.
*E03C 1/044* (2006.01)
*F16K 5/04* (2006.01)
*G05D 23/13* (2006.01)
*E03C 1/04* (2006.01)
*G05D 23/19* (2006.01)

(52) U.S. Cl.
CPC .......... *G05D 23/1393* (2013.01); *E03C 1/04* (2013.01); *E03C 1/044* (2013.01); *G05D 23/19* (2013.01); *F16K 5/0414* (2013.01)

(58) Field of Classification Search
CPC .......... E03C 1/04; E03C 1/044; F16K 5/0214; F16K 5/0414; F16K 5/061; G05D 23/19; G05D 23/1393; F24D 17/0089
USPC .......... 251/208, 209, 310; 137/341
See application file for complete search history.

(56) References Cited

U.S. PATENT DOCUMENTS

| | | | | |
|---|---|---|---|---|
| 783,313 | A * | 2/1905 | Roberts | A47K 1/09 137/606 |
| 2,277,291 | A * | 3/1942 | Blair | A47L 15/00 392/397 |
| 2,491,239 | A * | 12/1949 | Wildern | F16K 1/523 251/297 |
| 2,599,806 | A * | 6/1952 | Benchemoul | H01C 10/02 338/84 |

(Continued)

*Primary Examiner* — Kevin F Murphy
*Assistant Examiner* — Jonathan J Waddy
(74) *Attorney, Agent, or Firm* — Troutman Pepper Hamilton Sanders LLP (57) ABSTRACT

A hot water faucet system can include a housing, an outlet, a heating chamber, a valve assembly, and a handle. The valve assembly can include a valve assembly inlet, a valve body, a flow selector, and a valve cap. A handle is connected to and can rotate the flow selector within the valve body. The valve body includes a valve body aperture and the flow selector includes a notch. As the handle is rotated from zero degrees to approximately 90 degrees, the alignment of the notch, the valve body aperture, and the valve assembly inlet increases so that the flow of water from the valve assembly inlet increases. As the handle is rotated from approximately 90 degrees to approximately 160 degrees, the alignment of the notch, the valve body aperture, and the valve assembly inlet decreases so that the flow of water from the valve assembly decreases.

20 Claims, 5 Drawing Sheets

(56) References Cited

U.S. PATENT DOCUMENTS

| | | | | |
|---|---|---|---|---|
| 2,631,002 A * | 3/1953 | Mueller | ............... | F16K 5/0414 |
| | | | | 251/310 |
| 2,694,768 A * | 11/1954 | Stiebel | ................... | F24H 1/102 |
| | | | | 392/474 |
| 2,766,962 A * | 10/1956 | Nicholas | ............... | F16K 5/0414 |
| | | | | 251/310 |
| 3,898,429 A * | 8/1975 | Chodak | ................. | A47L 13/00 |
| | | | | 392/476 |
| 8,146,888 B1 * | 4/2012 | Hoeptner | ............. | F16K 5/0414 |
| | | | | 251/310 |
| 8,950,426 B2 * | 2/2015 | Yewdall | ................. | E03C 1/044 |
| | | | | 137/341 |
| 2012/0145807 A1 * | 6/2012 | Martinez | ................ | E03C 1/044 |
| | | | | 239/135 |

\* cited by examiner

HOT WATER FAUCET

RELATED APPLICATION

The present application claims priority to U.S. Provisional Patent Application No. 62/562,120, titled "Electric Hot Water Faucet Controls", and filed on Sep. 22, 2017, the entire content of which is incorporated herein by reference.

TECHNICAL FIELD

The present disclosure relates generally to water heaters, and more particularly to systems, methods, and devices for an electric hot water faucet.

BACKGROUND

Water heaters are generally used to provide a supply of heated water. Water heaters can be used in a number of different residential, commercial, and industrial applications. In certain instances, implementing a storage-type water heater tank is not practical or suitable. In those instances, tankless water heaters that do not involve a large storage tank can be implemented. Tankless water heaters are more compact in that they often have a heating element located proximate to or below a sink wherein the heating element receives cold water and heats the received water for delivery at the faucet or spout. The present disclosure provides improvements to tankless water heaters.

SUMMARY

In general, in one aspect, the disclosure relates to a hot water faucet system with a heating element located within the water faucet. In particular, the hot water faucet system can include a housing, an outlet, a heating chamber, a valve assembly, and a handle. An outlet pipe can connect the outlet to a heating chamber. The valve assembly can include a valve assembly inlet, a valve body, a flow selector, and a valve cap. A handle is connected to and can rotate the flow selector within the valve body. The valve body includes a valve body aperture and the flow selector includes a notch. As the handle is rotated from zero degrees to approximately 90 degrees, the alignment of the notch, the valve body aperture, and the valve assembly inlet increases so that the flow of water from the valve assembly inlet increases. As the handle is rotated from approximately 90 degrees to approximately 160 degrees, the alignment of the notch, the valve body aperture, and the valve assembly inlet decreases so that the flow of water from the valve assembly decreases.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

In general, example embodiments provide systems, methods, and devices for a water heating system that comprises a hot water faucet. In particular, the example hot water faucet comprises an internal heating chamber and a handle and valve that allow for easy control of the flow of hot water from the faucet. Example embodiments can be used for any size (e.g., capacity) of faucet and in a variety of applications (e.g., sink faucet, shower). Example embodiments can be located in any type of environment (e.g., warehouse, factory, lab, hospital, garage, mechanical room, basement) for any type (e.g., commercial, residential, industrial) of user.

Hot water faucet systems (or components thereof) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a hot water faucet system (or portions thereof) described herein can be made from a single piece (as from a mold, injection mold, die cast, or extrusion process). In addition, or in the alternative, components of a hot water faucet system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of hot water faucet systems, one or more of the components shown may be omitted, repeated, and/or substituted. Accordingly, example embodiments of hot water faucet systems should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of hot water faucet systems will be described more fully hereinafter with reference to the accompanying drawings, in which example embodiments of hot water faucet systems are shown. Hot water faucet systems may, however, be embodied in many different forms and should not be construed as limited to the example embodiments set forth herein. Rather, these example embodiments are provided so that this disclosure will be thorough and complete, and will fully convey the scope of hot water faucet systems to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of tank-based and tankless water heater systems.

Figure 1:
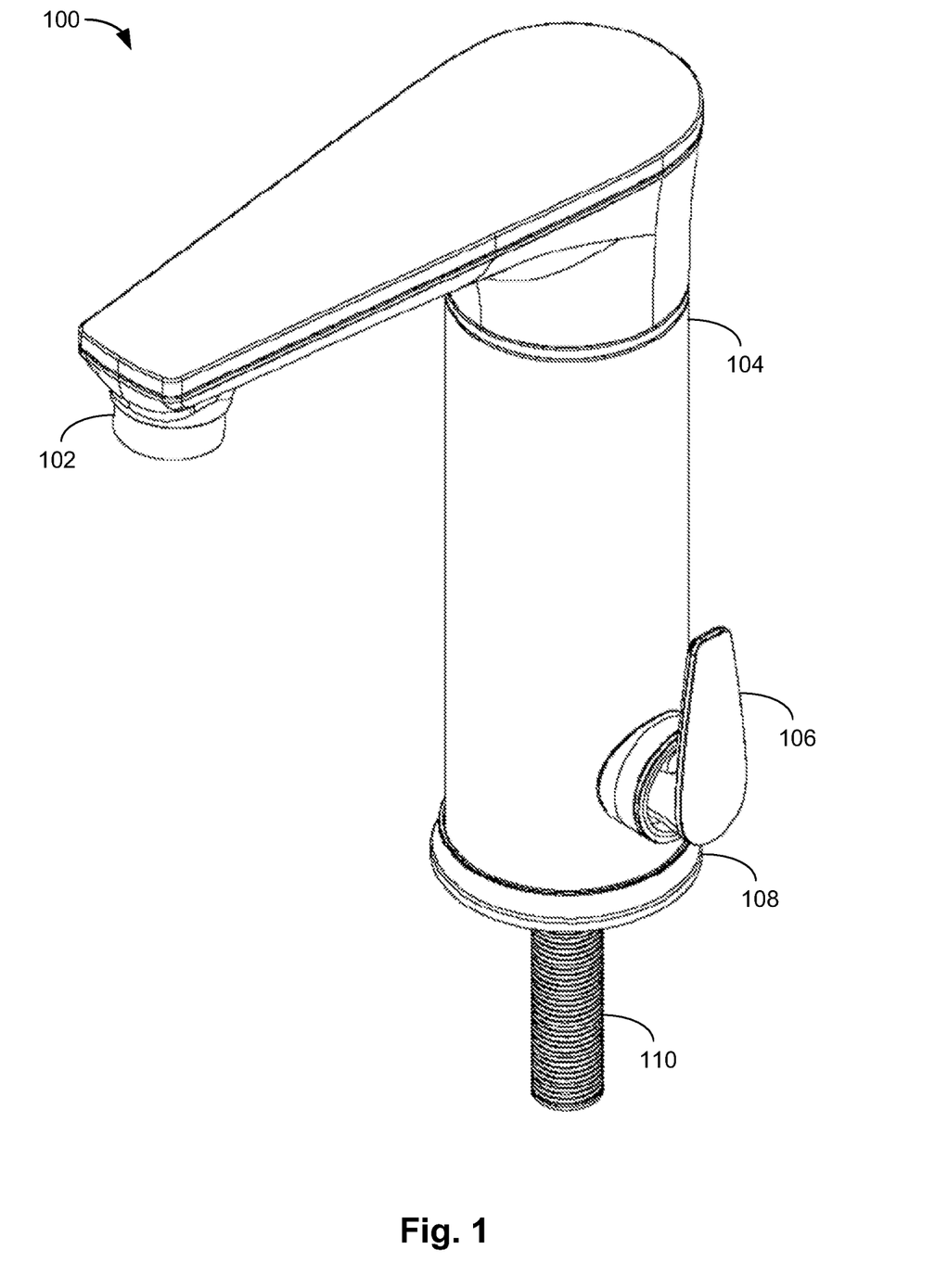
FIG. 1 shows a front perspective view of the hot water faucet in accordance with certain example embodiments.
Figure 2:
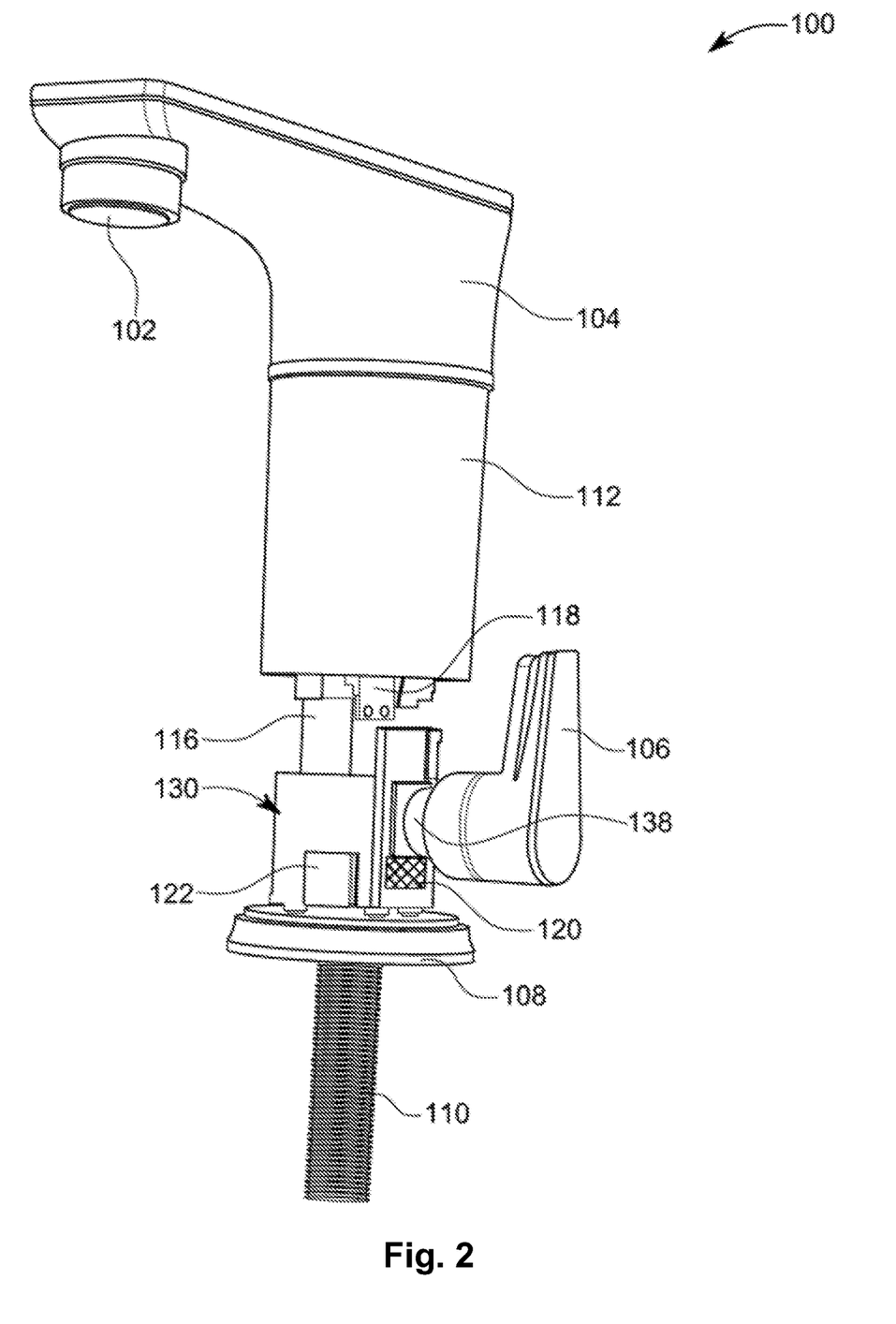
FIG. 2 shows a front perspective view of the hot water faucet with a portion of the housing removed in accordance with certain example embodiments.
Figure 3:
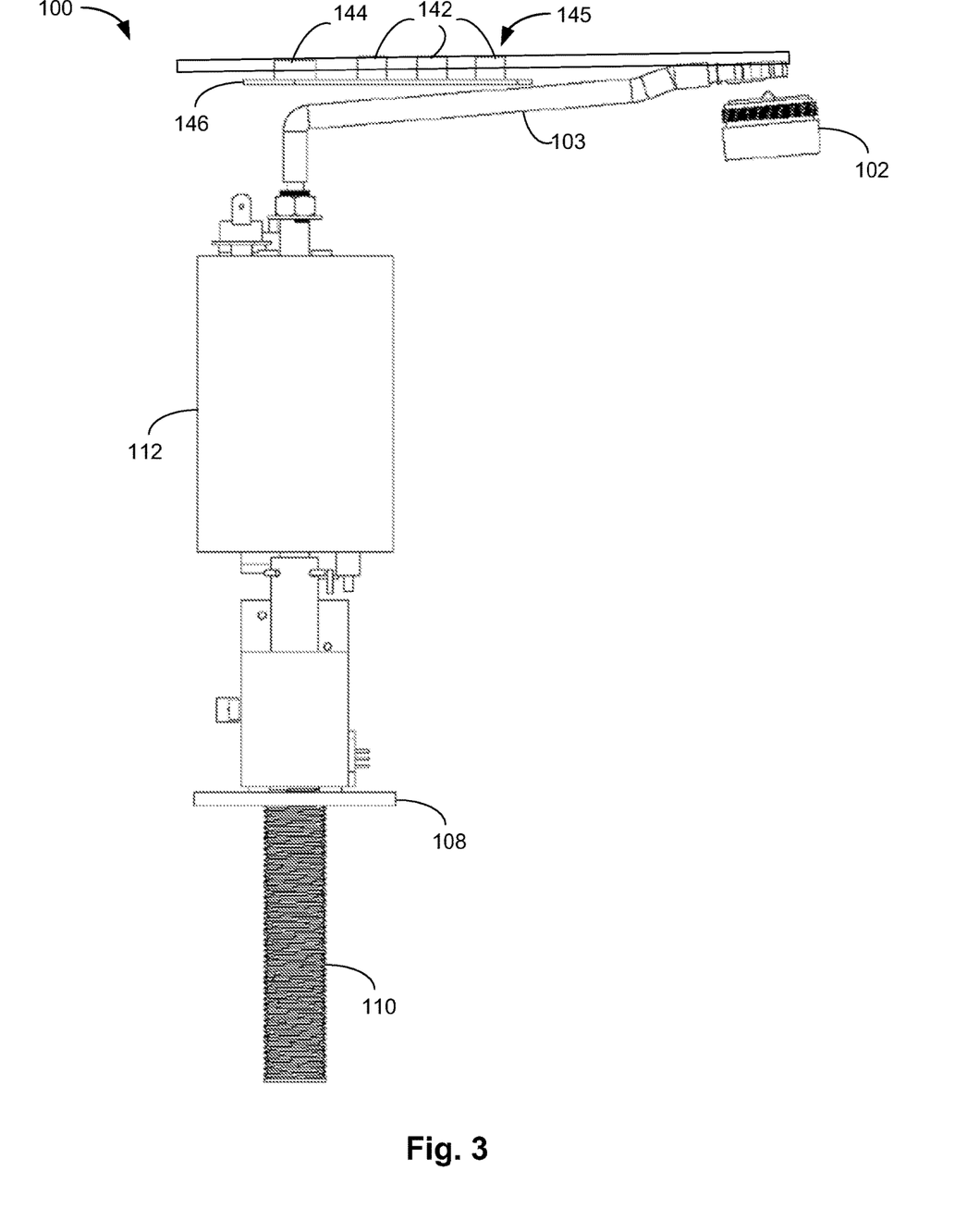
FIG. 3 shows a side perspective view of the hot water faucet with portions of the housing removed in accordance with certain example embodiments.

Referring to FIGS. 1-3, an example hot water faucet system 100 is illustrated. The example hot water faucet system 100 provides advantages in that a water heater and valve assembly for conveniently controlling the flow of heated water are contained within a housing. The hot water faucet system 100 comprises a housing 104 with an outlet 102 located at the outlet end of the housing 104. The outlet 102 can comprise an aerator and is in fluid communication with an outlet pipe 103. The outlet pipe 103 extends along the neck of the faucet system 100 and is coupled to heating chamber 112 at the end of the outlet pipe 103 opposite the outlet 102. The heating chamber 112 comprises a heating chamber inlet 116 through which water enters the heating chamber 112. The heating chamber 112 can receive electrical power from a power cord (not shown) and use the electrical power to heat water within the heating chamber. The internal components of the heating chamber can take any of a variety of forms. For example, a helical tube can circulate water within the heating chamber 112 while a resistive heating element can use the electrical power provided by the power cord to heat the water within the heating chamber. In other embodiments, the configuration of the internal components of the heating chamber 112 can take other forms.

The heating chamber inlet 116 receives water from the valve assembly 130, which in turn is coupled to a water inlet pipe 110. The example valve assembly 130 includes an optional Hall Effect sensor 122 for detecting the flow of water from the inlet pipe 110 to the valve assembly 130. Further components of the example valve assembly 130 will be described in greater detail below in connection with FIGS. 4 and 5. The water inlet pipe 110 can receive cold water from a water supply such as a well or a municipal water system. In the example illustrated in FIGS. 1-3, the valve assembly 130 rests on a base 108. The base 108 can rest on or be fastened to a counter top, a wall, or other support structure as appropriate for the particular implementation of the hot water faucet system 100. The power cord that supplies power to the heating chamber 112 can be threaded through an aperture in the base 108 or an aperture in the housing 104.

A flow selector 138 of the valve assembly 130 is attached to a handle 106 that extends out from a side of the housing 104. The handle 106 is configured to rotate in a range from 0 degrees (e.g., when the end of the handle 106 is pointed directly upward as shown in FIGS. 1-3) to approximately 160 degrees (e.g. when the end of the handle 106 is pointed generally downward). At the zero degree point of rotation for the handle 106, no water flows through the valve assembly 130. As the handle 106 is rotated from the 0 degree position to the 90 degree position, the flow of cold water through the valve assembly 130 increases. As the handle 106 is rotated past the 90 degree position, the handle 106 can engage the switch 120. For example, the handle 106 can comprise a protrusion that engages the switch 120 as the handle 106 is rotated past the 90 degree position. The switch 120 is electrically coupled to a relay 118 that delivers electrical power from the power cord to the heating chamber 112. As shown in FIG. 2, the relay 118 can be located on an underside of the heating chamber 112 or at any other convenient location. The relay can take a variety of forms. In some embodiments, the relay 118 can be implemented as a TRIAC. The TRIAC can receive a control signal (e.g., a 5V signal) from the switch 120, which causes the TRIAC to close to permit power (e.g., 120V) to flow from the power cord to one or more heating elements in the heating chamber 112. It should also be understood that the foregoing example rotational positions of the handle 106 (e.g., 90 degrees, 160 degrees) are non-limiting examples and in other embodiments the handle can be configured to control the flow of water and the application of heat at other rotational positions.

The relay 118 can also be controlled by a programmable controller 144, such as a microcontroller, disposed on a circuit board 146. The circuit board 146 can support one or more control buttons 142 that a user can engage via a user interface 145 located, for example, on a top surface of the housing 104. For example, a user can use the one or more control buttons 145 to select a set point temperature or a maximum temperature for the hot water the hot water faucet system delivers at the outlet 102. The programmable controller 144 can receive the maximum temperature or other settings and use these inputs to control the relay 118 or other components of the hot water faucet system 100. For example, a temperature sensor such as a thermistor can be located proximate to the outlet 102 and provide to the programmable controller 144 temperature measurements of the water exiting the hot water faucet system 100. The hot water faucet system 100 can also comprise one or more cut-off switches that turn off power to the heating chamber 112 if the water temperature exceeds a pre-programmed maximum temperature or a maximum temperature set by a user. It should be understood that the programmable controller 144, control buttons 142, and user interface 145 are optional components and in alternate embodiments, these components may be absent or modified.

Figure 4:
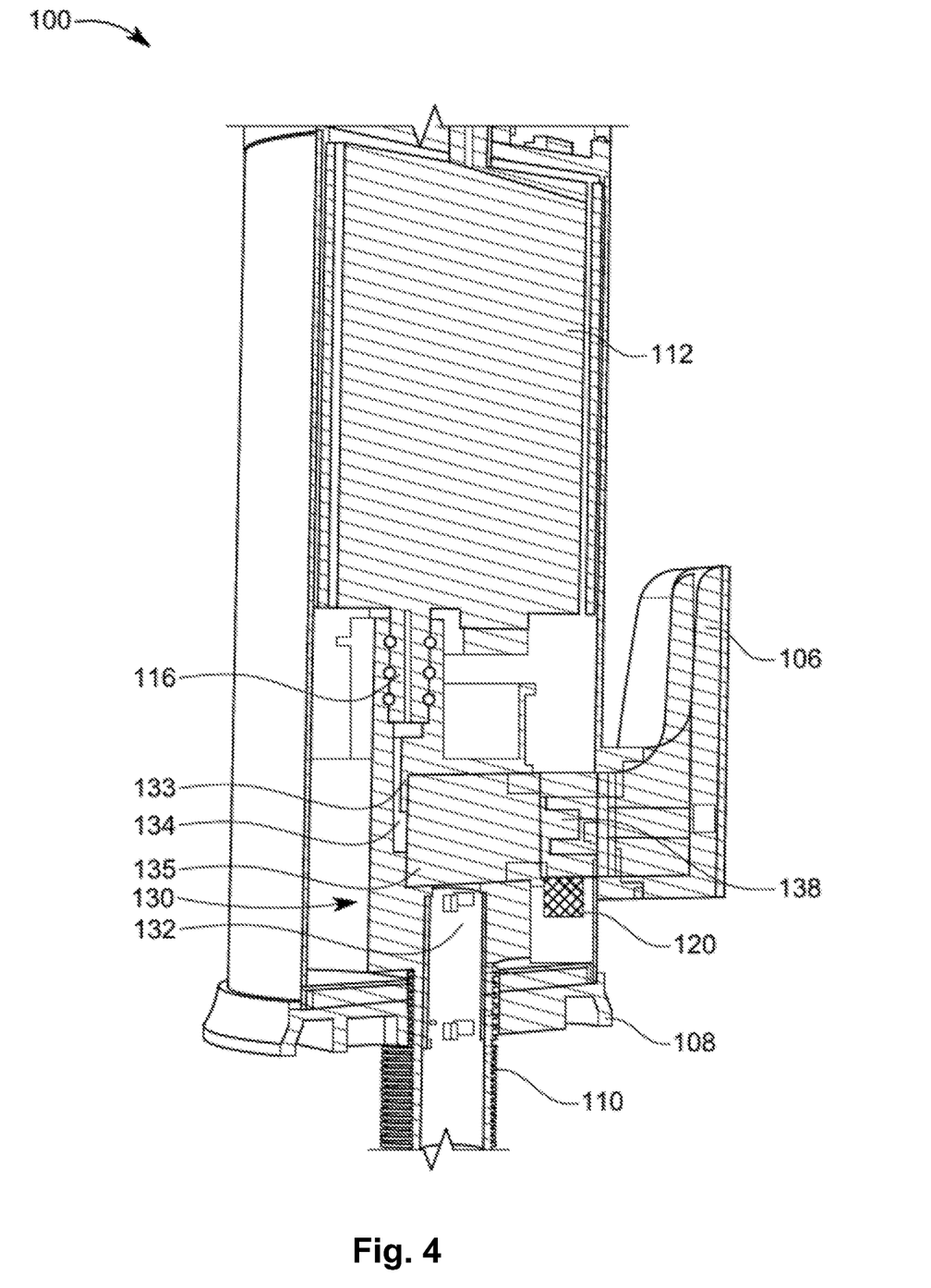
FIG. 4 shows a side cross-sectional view of the hot water faucet in accordance with certain example embodiments.
Figure 5:
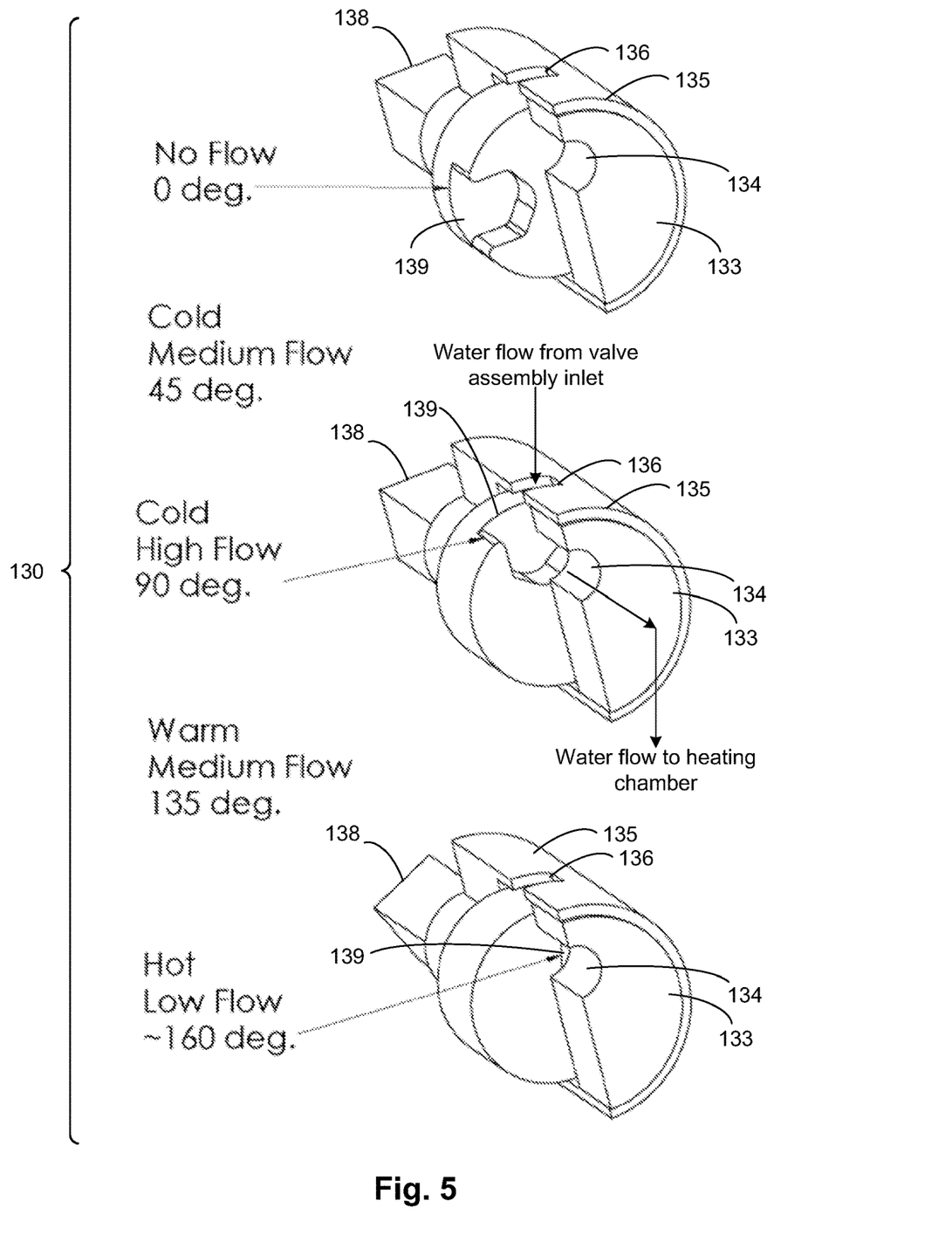
FIG. 5 shows varying positions of a valve assembly of the hot water faucet in accordance with certain example embodiments.

Turning to FIGS. 4 and 5, the components and operation of the valve assembly 130 are described and illustrated in greater detail. FIG. 4 illustrates a detailed cross-sectional view of the valve assembly 130 installed in the hot water faucet system 100. In FIG. 5, the valve assembly 130 is shown in three different rotational positions, each of which are perspective, partial cross-sectional views wherein the valve assembly 130 has been inverted from its position shown in FIG. 4. In other words, in the three views of FIG. 5, the valve assembly 130 is shown turned over so that the bottom portion of the valve assembly 130 where water enters the valve assembly 130 is shown on top. The valve assembly 130 comprises a valve body 135 that has a generally cylindrical shape with a valve body aperture 136 on the bottom side of the valve body 135. When the valve assembly 130 is installed, the valve body aperture 136 faces the valve assembly inlet 132 at the bottom of the hot water faucet system 100.

At an outlet end of the valve assembly 130, a valve cap 133 is located with a valve cap aperture 134. At the opposite or handle end of the valve assembly 130, a flow selector 138 is located. The flow selector comprises a stem and a disk. The stem portion of the flow selector 138 extends from the handle end of the valve assembly 130 and is coupled to handle 106. The disk portion of the flow selector 138 comprises a notch 139 on one face of the disk. Because of the coupling between the handle 106 and the flow selector 138, as the handle 106 rotates the flow selector 138 also rotates within the valve body 135. The valve cap and its valve cap aperture 134 remain stationary within the valve body 135 and do not rotate with the rotation of the flow selector 138.

FIG. 5 illustrates the operation of the valve assembly 130 by providing three views of the valve assembly 130 with the flow selector 138 rotated to different positions. The top view in FIG. 5 shows the valve assembly 130 in the 0 degree position. In the top view, the valve body aperture 136 is aligned with the valve assembly inlet 132 and the inlet pipe 110. However, the flow selector 138 is positioned such that the notch 139 is not aligned with the valve body aperture 136. Therefore, no water can pass through the valve assembly 130 and no water leaves the outlet 102 of the hot water faucet system 100. As the handle 106 and the flow selector 138 are rotated to the 45 degree position a portion of the notch 139 will be aligned with the valve body aperture 136 so that cold water can flow at a medium flow rate from the inlet pipe 110, through the valve assembly inlet 132, then through the valve body aperture 136, then through the notch 139, then through the valve cap aperture 134, which is in fluid communication with the heating chamber inlet 116. Although an image of the valve assembly 130 at the 45 degree rotational position is not provided in FIG. 5, it should be understood that the position of the notch 139 would be half way between the 0 degree position shown in the top image of FIG. 5 and the 90 degree position shown in the middle image of FIG. 5.

Turning to the middle image shown in FIG. 5, the handle 106 and flow selector 138 have been rotated to the 90 degree position where the notch 139 is aligned with the valve body aperture 136. At the 90 degree rotational position, cold water flows through the valve assembly 130 at a high flow rate. In other words, at the 90 degree rotational position, more cold water can flow through the valve body aperture 136 and the notch 139 than when the notch 139 was only partially aligned with the valve body aperture 136 at the 45 degree rotational position. As shown by the arrows and labels in the middle image of FIG. 5, cold water flows from the valve assembly inlet 132, through the valve body aperture 136, then through the notch 139, then through the valve cap aperture 134, and then to the heating chamber inlet 116.

As described previously, when the handle 106 rotates past the 90 degree position, the handle 106 engages switch 120 to provide power to the heating chamber 112 for heating the water as it passes through the hot water faucet system 100. It should be recognized that the relative positions of the handle 106 and the switch 120 can be adjusted so that the handle 106 engages the switch 120 at any desired position. As illustrated in FIG. 5, as the flow selector 138 is rotated from the 90 degree rotational position to the 135 degree rotational position, the portion of the notch 139 aligned with the valve body aperture 136 will decrease thereby decreasing the flow of water through the valve assembly 130 from a high flow back to a medium flow. However, unlike the 45 degree rotational position, at the 135 degree rotational position, the medium flow of water passing through the valve assembly 135 will be heated in the heating chamber 112 because the handle 106 has engaged the switch 120 and power is being supplied to the heating element in the heating chamber 112.

In the bottom image of the valve assembly 130 shown in FIG. 5, the flow selector 138 has been rotated to approximately the 160 degree rotational position so that only a small portion of the notch 139 is aligned with the valve body aperture 136. Because only a small portion of the notch 139 is aligned with the valve body aperture 136 in the 160 degree rotational position, the water passing through the valve assembly 130 slows to a low flow rate. The low flow rate reduces the volume of water passing through the heating chamber 112 and, therefore, the water is heated to a higher temperature. As a result, the temperature of the water exiting the hot water faucet system 100 is correlated to the rate of water flow the user selects with the handle 106. In other words, the water provided by the hot water faucet system 100 is at a medium temperature and medium flow rate at the approximately 135 degree rotational position. In comparison, the water provided by the hot water faucet system 100 is at a higher temperature (e.g., the maximum set point temperature selected by the user via the user interface 145) and lower flow rate at the approximately 160 rotational position. If at the lower flow rate the water reaches the maximum set point temperature, the programmable controller 144 or a cut-off switch can turn off the power supplied to the heating chamber 112. The example valve assembly is advantageous in that, while different from a standard mixing valve faucet, it appears to the user to mimic the behavior of a standard mixing valve faucet to make the hot water faucet system 100 more intuitive to the user.

Those of skill in this field will appreciate that the valve assembly 130 can have other features, such as 0-rings, that are not shown in the figures so as to clearly illustrate the example embodiments. As another example, in alternate embodiments, the switch 120 can be replaced with a rotary encoder that provides the position of the handle to a controller such as programmable controller 144. A rotary encoder provides additional advantages in that it can be adjustably scaled based on the maximum temperature set for the faucet. For example, if a relatively low maximum temperature is set for the faucet, the rotary encoder can be rescaled so that the maximum rotation of the handle corresponds with a relatively lower power supplied to the heating chamber 112. It should be understood that the example valve assembly 130 can be implemented in other embodiments with components that have different shapes and features. Additionally, in alternate embodiments, the handle can be located in different positions are have different ranges of motion for controlling the flow of water.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A hot water faucet system, comprising:
a housing;
an inlet pipe configured to receive water;
an outlet disposed at an outlet end of the housing;
an outlet pipe connecting the outlet to a heating chamber and configured to output the water, the heating chamber disposed within the housing;
the heating chamber connected to a valve assembly, the valve assembly coupled to a handle disposed on an outer surface of the housing, the valve assembly comprising:
a valve assembly inlet;
a valve body;
a flow selector attached to the handle, the flow selector disposed within the valve body, the flow selector configured to:
rotate from a first position to a second position, a flow of water through the valve assembly increasing as the flow selector rotates, and
rotate from the second position to a third position, the flow of water through the valve assembly decreasing as the flow selector rotates; and
a valve cap disposed at a valve outlet end; and
a switch configured to activate a heating element disposed within the heating chamber by the flow selector rotating from the second position to the third position.

2. The hot water faucet system of claim 1, wherein the valve assembly is attached to a base of the hot water faucet system.

3. The hot water faucet system of claim 1, wherein the inlet pipe is in fluid communication with the valve assembly inlet.

4. The hot water faucet system of claim 1, wherein the valve body comprises a valve body aperture in fluid communication with the valve assembly inlet and the inlet pipe.

5. The hot water faucet system of claim 4, wherein the flow selector is rotatable within the valve body.

6. The hot water faucet system of claim 5, wherein the flow selector comprises a notch.

7. The hot water faucet system of claim 6, wherein when the notch is aligned with the valve body aperture, water can flow from the inlet pipe through the valve assembly inlet, through the valve body aperture, through the notch, and exit the valve assembly via the valve cap.

8. The hot water faucet system of claim 6, wherein the notch is disposed on the flow selector such that:
at zero degrees of rotation of the flow selector, the notch is not aligned with the valve body aperture;
at 45 degrees of rotation of the flow selector, the notch is partially aligned with the valve body aperture;
at 90 degrees of rotation of the flow selector, the notch is completely aligned with the valve body aperture; and
at 135 degrees of rotation of the flow selector, the notch is partially aligned with the valve body aperture.

9. The hot water faucet system of claim 6, wherein the notch is disposed on the flow selector such that the flow of water through the valve assembly:
increases as the flow selector is rotated from 45 degrees to 90 degrees, and
decreases as the flow selector is rotated from 90 degrees to 135 degrees.

10. The hot water faucet system of claim 4, wherein the flow selector is rotatable within the valve body, the flow selector being rotatable within a range of zero degrees to less than or equal to 270 degrees.

11. The hot water faucet system of claim 1, wherein the flow selector comprises a stem and a disk.

12. The hot water faucet system of claim 11, wherein the stem extends from the valve assembly and the disk comprises a notch.

13. The hot water faucet system of claim 1, wherein the valve cap comprises a valve cap aperture.

14. The hot water faucet system of claim 13, wherein the valve cap aperture is in fluid communication with a heating chamber inlet.

15. The hot water faucet system of claim 1, wherein the switch is disposed adjacent to the handle, the switch configured to supply power to the heating chamber.

16. The hot water faucet system of claim 1, wherein the switch is coupled to a relay, the relay configured to receive a signal from the switch to permit electric power to flow to the heating chamber.

17. The hot water faucet system of claim 16, wherein the relay is a triac.

18. The hot water faucet system of claim 16, wherein the relay is coupled to a controller.

19. The hot water faucet system of claim 18, wherein the controller receives a set point temperature input via a user interface on the hot water faucet system.

20. The hot water faucet system of claim 1, wherein the switch supplies power to the heating chamber when the handle is rotated to 90 degrees.

* * * * *